United States Patent [19]

Tribbett

[11] Patent Number: 4,518,337
[45] Date of Patent: May 21, 1985

[54] HYDRAULIC PRESS

[75] Inventor: Murray C. Tribbett, Piqua, Ohio

[73] Assignee: The French Oil Mill Machinery Co., Piqua, Ohio

[21] Appl. No.: 528,346

[22] Filed: Aug. 31, 1983

[51] Int. Cl.³ .......................... B29F 1/00; B30B 11/02
[52] U.S. Cl. .................................. 425/167; 425/450.1; 425/589; 425/406; 425/411
[58] Field of Search ............... 425/150, 162, 167, 589, 425/590, 450.1, 406, 408, 411; 264/40.5

[56] References Cited

U.S. PATENT DOCUMENTS

| 2,711,561 | 6/1955 | Studli | 425/595 |
| 2,841,826 | 7/1958 | Brucker | 425/595 |
| 3,142,093 | 7/1964 | Tribbett | 425/406 |

OTHER PUBLICATIONS

"REP", advertising brochure published by REP Corporation, P.O. Box 392, 8N750 Tameling Lane, Bartlett, IL 60103, (No pub. date).
"Take Advantage of Our Advance", advertising brochure by REP, L-Injection du Caoutchocu, Rue de Dauphine, B.P. 369, Corbas, 69800 Saint-Priest—Lyon, France, (No publication date).
"Generation IV", advertising brochure published by REP Corporation, Bartlett, IL, (No publication date).
"Dieffenbacher Transfermat System Automatic Injection Moulding Presses with Screw Preplasticizer", mfg. brochure publ. by Advanced Machine Design Co., 3380 Lakeland Bld., Cleveland, OH, (No publication date).
"French Rubber Injection Molding Presses", advertising brochure published by French Hydraulic Press Division, French Oil Mill Machinery Co., P.O. Box 920, Piqua, Ohio 45356, (No publication date).
"R80", advertising brochure published by Via Raffaello Sanzio, 21050 Lonate Ceppino (Va) Italia, (No publication date).
"Rubber Injection Molding by HYDRATECS", advertising brochure published by Hydratecs, Inc., 1050 Eagon Street, Barberton, Ohio 44203, (No publication date).
"The All-American Screw/Ram Injection Molding Press . . . VULCAMATIC", advertising brochure published by Lewis Molding Machinery, 16300 South Waterloo Road, Cleveland, Ohio 44110, (No publication date).
"Setting the Pace Means Innovation", advertising brochure published by McNeil Akron, Inc., 96 East Crosier Street, Akron, Ohio 44311, (No publication date).

Primary Examiner—J. Howard Flint, Jr.
Attorney, Agent, or Firm—Biebel, French & Nauman

[57] ABSTRACT

A hydraulic press of the type having first and second oblong side plates joined at upper and lower ends thereof to form a structure supporting upper and lower hot plates and injection molding equipment in which one of the side plates includes channels formed in its interior for conveying hydraulic fluid from a source of fluid under pressure, through valves mounted on the side plate, to and from the hydraulic equipment, and back to a reservoir.

8 Claims, 15 Drawing Figures

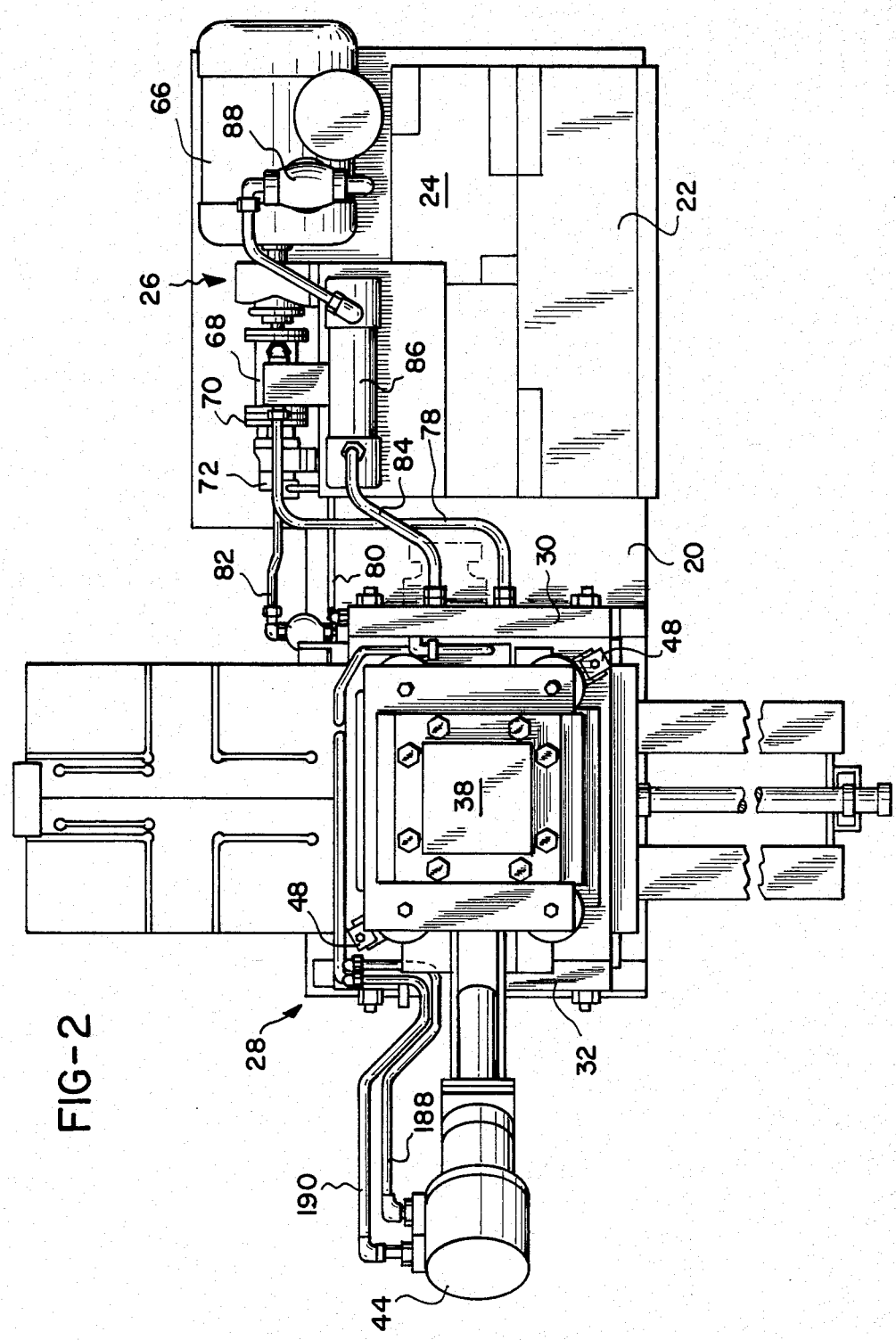

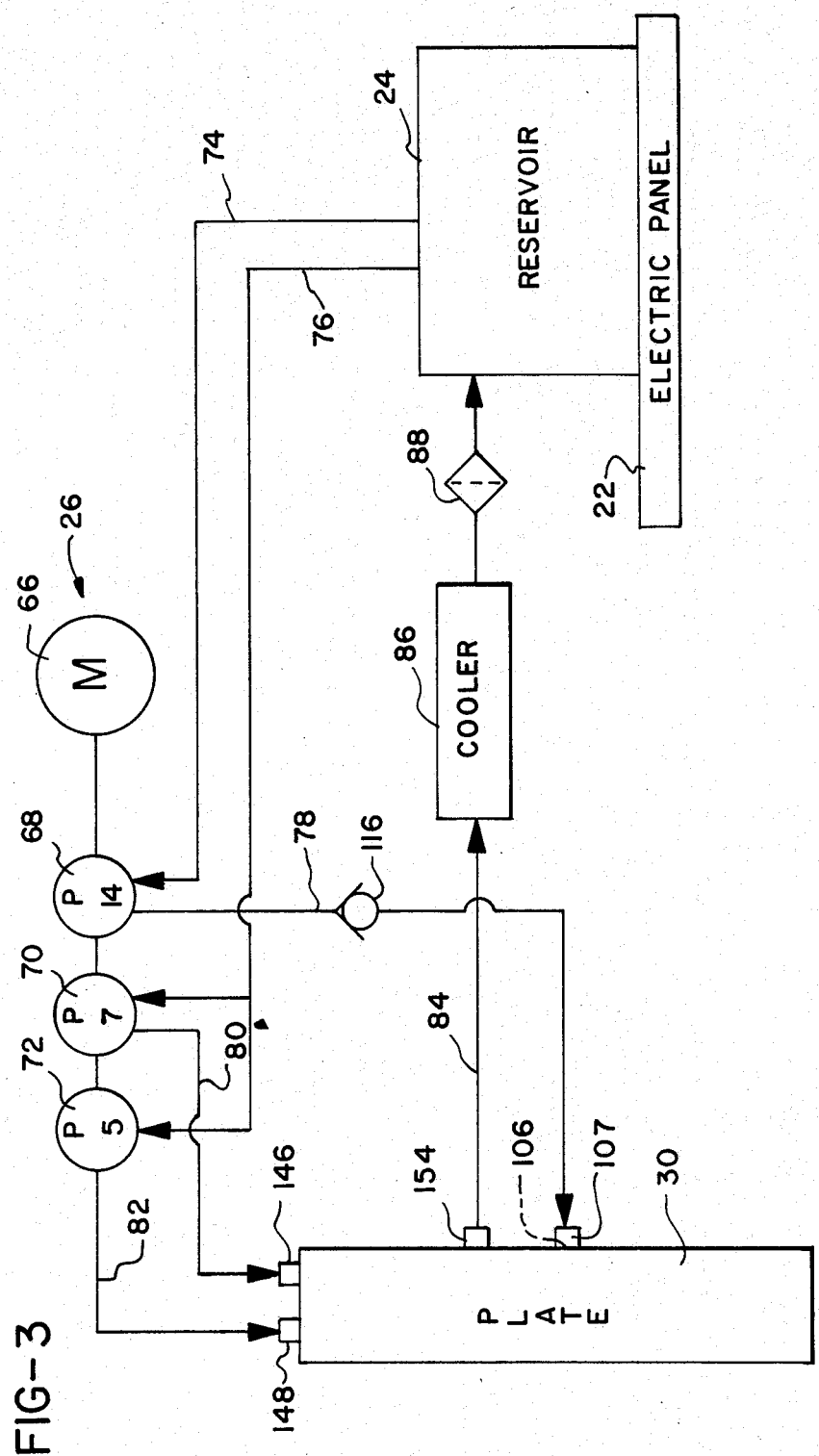

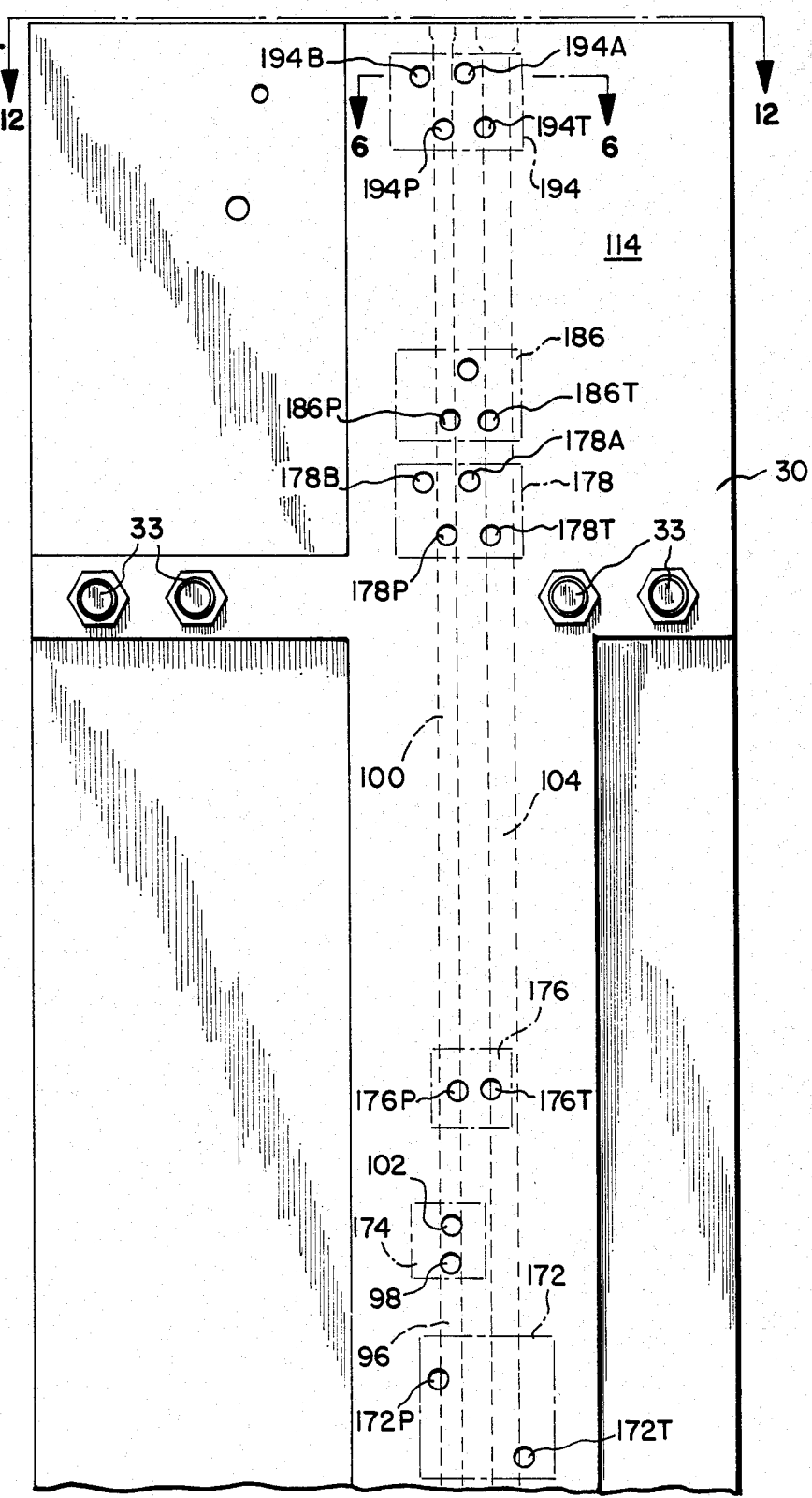

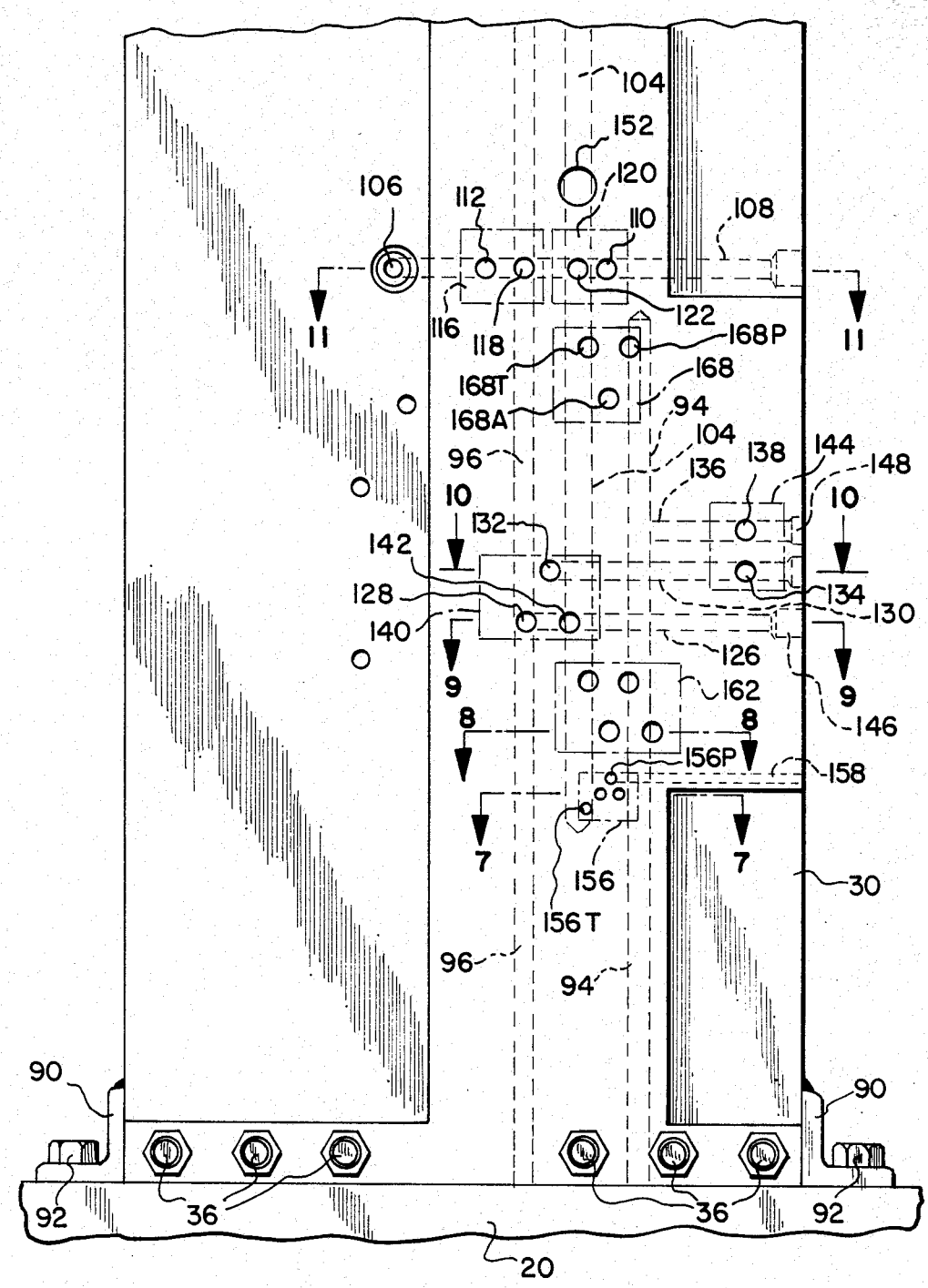

HYDRAULIC PRESS

BACKGROUND OF THE INVENTION

The present invention relates to hot plate presses and, more particularly, to hot plate presses which are operated entirely by hydraulic machinery.

Hot plate presses, also known as injection molding presses, typically consist of a single base on which is mounted a hydraulic pump, a reservoir of hydraulic fluid, and the press itself. The press consists of a stationary upper hot plate adapted to support a mold half, a lower hot plate mounted on a vertically movable platen and adapted to support a complementary mold half, and injection molding equipment connected to the upper hot plate.

The complementary mold half of the lower hot plate is moved upwardly by lifting cylinders to engage the upper mold half, and the mold halves are clamped together by a clamping cylinder which urges the movable lower platen upwardly toward the fixed upper platen. In one embodiment of such a hydraulic press, the movable lower platen includes a vertically oriented post which slides in and out of a hole formed in the base of the press as the lifting cylinders move the platen upwardly or downwardly. To lock the platen in an upward position, the lifting cylinders lift the platen upwardly until the post is withdrawn completely from the hole, then a hydraulic rotary actuator is activated to pivot a plate which covers the hole. The platen is then urged downward until the post rests on top of the plate. The clamping cylinder is then actuated to clamp the mold halves together and the injection step can then be initiated.

The injection molding equipment includes a hydraulically operated screw conveyor positioned within a heated chamber for receiving the material to be injected into the mold, and an injection cylinder communicating with the heated screw. The injection cylinder typically is vertically oriented and includes a ram connected to a hydraulic cylinder. In operation, the hydraulic screw receives a charge of material such as plastic or rubber, heats the material to plasticize it, then conveys material by the screw conveyor to the injection cylinder. The flow of material into the cylinder causes the ram to move upwardly and evacuate fluid from the portion of the injection cylinder above the piston connected to the ram. Once a charge of plasticized material has been received, the injection cylinder is actuated and the piston drives the ram downwardly to force the plasticized material through a sprue and into the mold cavity formed by the clamped upper and lower mold halves.

All of the components previously described are often powered by pressurized hydraulic fluid which is conveyed from a motor-driven pump mounted on the base. With such systems, the output of the pump is conveyed by a rigid conduit to a valve manifold or valve plate. The valve manifold is mounted on the base and is spaced from the press itself, typically interposed between the reservoir and pump assembly and the press. The valve manifold supports all of the valves which actuate the hydraulic components of the press, and may include internal or enclosed conduits which connect the valves to the hydraulic supply line from the pump and to the return line to the reservoir. The valves are also connected by means of flexible hoses to their corresponding hydraulic components on the press.

A disadvantage with hot presses of this type is that the presence of a valve manifold between the hydraulic press components and the pump and reservoir components requires additional space on the base and hence increases the overall dimensions of the press. Another disadvantage is that the valves of the valve manifold communicate with their corresponding hydraulic components by flexible hoses, each of which has a useful life which is substantially less than a corresponding length of rigid hose made of metal. Furthermore, these lengths of hose must be relatively long and must be fitted about the side plates on side structure of the press.

Accordingly, there is a need for a hydraulically operated hot press in which the overall dimensions of the base supporting the press are held to a minimum. Furthermore, there is a need for a hydraulic press in which the distance between the hydraulic valves and their corresponding hydraulic components is held to a minimum, thereby minimizing the number and lengths of flexible hose required.

SUMMARY OF THE INVENTION

The present invention is a hydraulic press having a side plate which functions as a structural member to support the hydraulic press components, and at the same time functions as a valve manifold or valve plate on which valves are mounted which control the hydraulic components of the press. Conduits for conveying hydraulic fluid are integral with the side plate and communicate with the hydraulic pumps, the reservoir, and the hydraulic components of the press, and interconnect the valves as well. By combining the valve plate with the structural side plate of the press, significant savings in fabrication costs and maintenance costs can be effected.

For example, a primary advantage of combining the valve plate and structural side plate is that the space necessary to mount a conventional valve plate on the base of the press, is eliminated, thereby reducing the floor space required for the press. The cost of materials and labor necessary to fabricate a separate valve plate and mount it on the base is eliminated, thereby reducing the overall cost of the machine. Another advantage of the invention is that, by combining the valve manifold with a structural side plate, the locations of the valves are much closer to their corresponding hydraulic components, thereby reducing the lengths of hydraulic conduit required to connect the valves with their components.

Furthermore, a rigid conduit can be used to extend between the valves and those hydraulic components which are fixed to the press and do not move during a pressing cycle. With prior art presses, flexible conduit was used almost exclusively to connect the valve plate with the hydraulic components since it was necessary to bend the conduit around the press supporting structure which was positioned between the valve plate and hydraulic components. By combining the valve plate and structural side plate, this intermediate obstacle is removed, making it economically possible to provide rigid metal conduit instead of the traditional flexible conduit which has a shorter life span and requires more maintainance.

In a preferred embodiment of the invention, the hydraulic press is of the type having a base, hydraulic pumps mounted on the base, a hydraulic fluid reservoir mounted on the base and connected to the hyraulic pumps, a press having an upper hot plate adapted to support a mold half, a hydraulically actuated screw conveyor and injection cylinder for conveying liquid material to the hot plate, and a lower reciprocating platen. The lower platen is mounted for vertical reciprocating movement relative to the upper hot plate and includes a lower plate adapted to support a complementary mold half. The lower platen includes hydraulic cylinders for lifting the lower hot plate toward the upper hot plate and a hydraulic cylinder for urging the lower hot plate upwardly to clamp together the mold halves supported on the hot plates.

The hot plates, hydraulic motors and hydraulic cylinders are mounted on a press consisting of a first oblong side plate mounted on the base, a second oblong side plate mounted on the base and having channels formed in its interior for conveying hydraulic fluid, a head block connecting upper ends of the side plates together, and tie rods joining the lower ends of the side plates together to form a rigid structure. The channels formed within the second side plate are connected to the hydraulic components of the press by conduits. A supply conduit extends from the hydraulic pumps to the channels in the side plate, and a return conduit extends from the channels to the reservoir. Valves are mounted on the second side plate and are in fluid communication with the channels and conduits for supplying fluid from the channels to the hydraulic screw, injecting cylinder, lower hot plate lifting cylinders, and clamping cylinder. A control is mounted on the frame for actuating the valves in a predetermined sequence to direct fluid from the supply conduit through the channels of the second side plate and through conduits from the side plate to selected ones of the hydraulic components of the press.

Preferably, the second side plate includes a pair of pressure channels which are connected to the hydraulic pumps, and a tank channel which is connected to the reservoir. The valves mounted on the plate communicate with the pressure and tank channels, and with holes formed through the side plate. The holes are connected to corresponding hydraulic components by conduits.

Accordingly, it is an object of the present invention to provide a hydraulic press in which the valve plate or valve manifold is combined with a structural member of the press; to provide a hydraulic press which has minimal floor space requirements; a hydraulic press which is minimizes the number and lengths of flexible hose required to connect the hydraulic components with their corresponding valves; and a hydraulic press which is relatively inexpensive to fabricate and maintain.

Other objects and advantages of the invention will be apparent from the following description, the accompanying drawings and the appended claims.

BRIEF DESCRIPTION OF THE DRAWINGS

FIG. 2 is a top plan view of the press of FIG. 1, taken at line 2—2 of FIG. 1;

FIG. 3 is a hydraulic schematic diagram of the press of FIG. 1, showing the connection between a side plate, pumps and reservoir;

FIG. 4 is a side elevation of the upper portion of the side plate shown in FIG. 1, in which outlines indicating the locations of the valves are shown;

FIG. 5 is the lower portion of a side plate shown in FIG. 4 in which outlines indicating the locations of the valves are shown;

DETAILED DESCRIPTION OF THE PREFERRED EMBODIMENT

Figure 1:
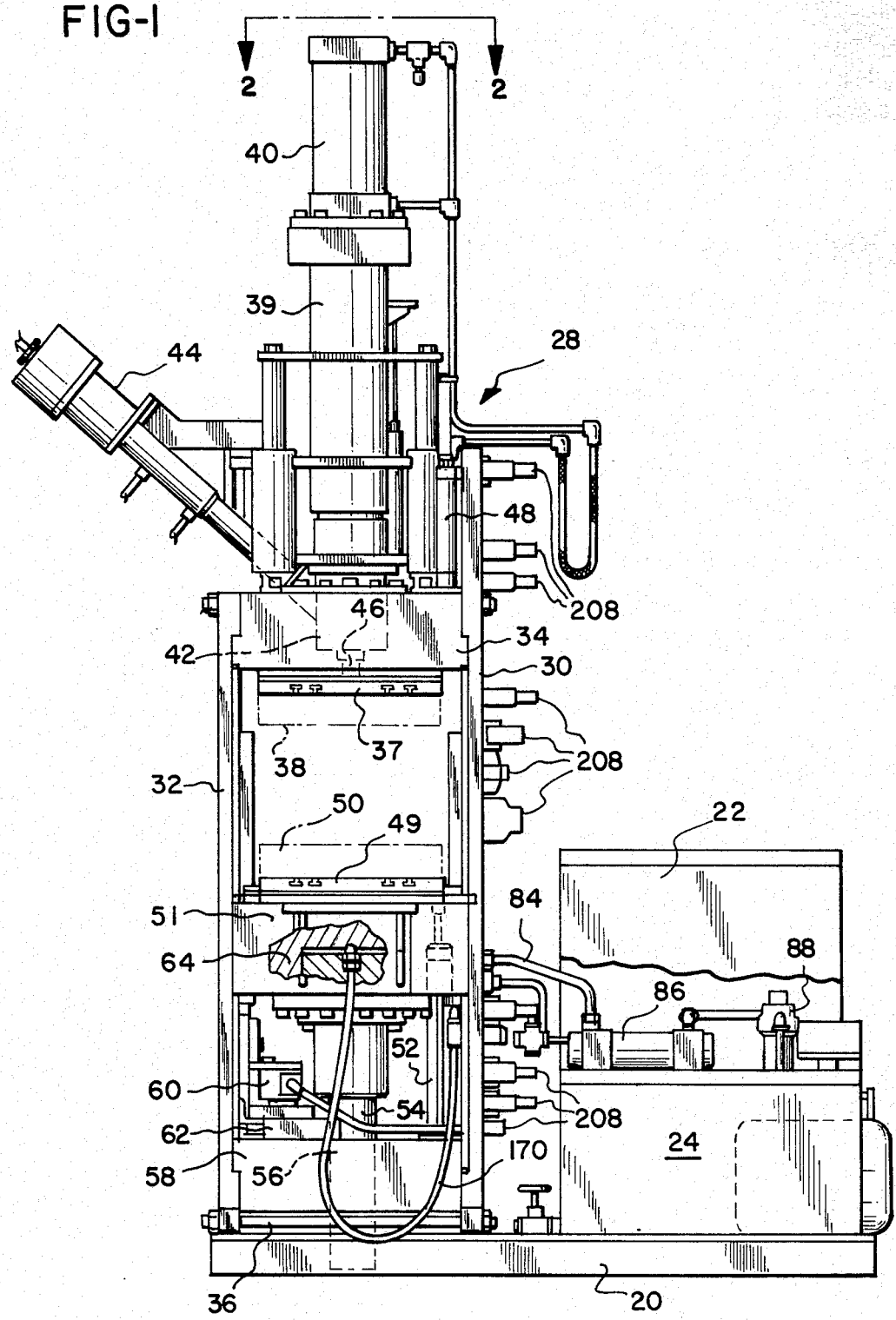
FIG. 1 is a side elevation of a hot plate press representing a preferred embodiment of the invention.
Figure 7:
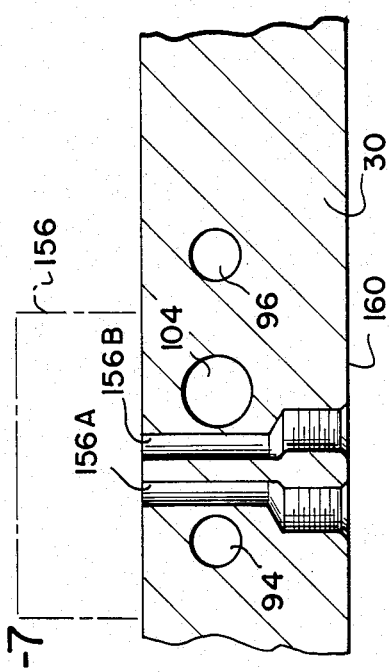
FIG. 7 is a detail of a cross section of the side plate shown in FIG. 5, taken at line 7—7 in FIG. 5.
Figure 6:
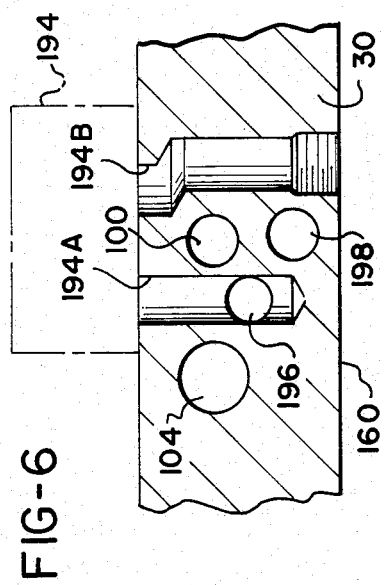
FIG. 6 is a detail of a cross section of the side plate shown in FIG. 4, taken at line 6—6 in FIG. 4.

As shown in FIGS. 1 and 2, a preferred embodiment of the hydraulic press of the present invention includes a unitary base 20 on which is mounted an operating console 22, a reservoir of hydraulic fluid 24 and pump assembly 26. Operating console 22 controls a programmable process controller, such as the Epic System 10 manufactured by Solid Controls, Inc., Minneapolis, Minn., which actuates the valves associated with the press in a predetermined, programmed sequence.

A pressing apparatus, generally designated 28, is also mounted on the base 20. It is understood that, while the preferred embodiment of FIGS. 1 and 2 shows the aforementioned components mounted on a single base 20, it is within the scope of the invention to provide a hydraulic press in which the components are mounted on separate bases, or are in a different spacial arrangement relative to each other.

Hydraulic Components

The pressing apparatus 28 includes a left side plate 30 and right side plate 32 which are joined at the top by nut and bolt combinations 33 (FIG. 4) to head block 34 and are joined together at the bottom by a tie rod and spacer combinations 36 (see also FIG. 5). The right side plate 30, left side plate 32, head block 34 and tie rod combination 36 form a rigid framework which supports the hydraulic pressing apparatus to be described. Since all of the following components are well-known to those having skill in the art of press design, their design and function will be discussed only briefly, it being understood that other types of hydraulic components may be substituted and not depart from the scope of the invention.

The head block 34 supports an upper hot plate 37 which is adapted to receive an upper mold half 38 (shown in phantom). An injection tower 39 includes an injection cylinder 40 having a piston connected to a ram (not shown) that reciprocates within a chamber 42. A hydraulically operated screw 44 includes a helical screw (not shown) which is rotated by a hydraulic motor within a heated barrel and communicates with the chamber 42. The heated barrel is adapted to receive granular plastic or strip rubber material which is liquified within the heated barrel.

Rotation of the screw by the hydraulic motor forces liquifed plastic material from the barrel into the chamber 42, and continued inflow of material causes the ram of the injection cylinder 40 to raise. Once a sufficient charge has been received within the chamber 42, the injection cylinder is actuated to move the ram downwardly, forcing the material through a nozzle 46 carried by the chamber 42. From the nozzle 46 the material enters a sprue bushing (not shown) located in the mold and from the sprue bushings the material enters a runner system (not shown) and then into the cavities of the mold. The injection tower 39 is mounted on the head block 34 and can be lifted upwardly away from the head block by a pair of lifting cylinders 48 (one of which is shown), to break contact between the sprue bushing and nozzle 46.

A lower hot plate 49 is positioned directly beneath the upper hot plate 37 and is adapted to receive a complimentary mold half 50 (shown in phantom). The lower hot plate 48 is mounted on a lower platen 51 which is raised and lowered relative to the upper hot plate 37 by a pair of lifting cylinders 52 (only one of which is shown). The lower platen 51 includes a downwardly depending column 54 positioned within a hole 56 formed in a pressing frame 58.

The column 54 is sized such that, when the lifting cylinders raise the lower platen 51 to an appropriate height to bring the mold halves 38,50 together, the column is completely removed from the hole 56. At this time, a hydraulic actuator 60 rotates a cover plate 62 which covers the hole 56 so that the bottom of the column rests upon it. In order to clamp the mold halves 38,50 together sufficiently to perform an injection molding operation, the lower platen 51 includes a clamping cylinder 64 which is hydraulically actuated to urge the upper portion of the lower platen 51 upwardly, and includes a spring return (not shown).

Pump Assembly

As shown in FIGS. 2 and 3 the pumping assembly 26 includes an electric motor 66 which drives pumps 68, 70, and 72. Pumps 68-72 are fed from reservoir 24 by feed lines 74, 76. Preferably, pump 68 is a high volume pump, having an output on the order of fourteen gallons per minute, and its output is pumped through line 78. Pump 70 is a lower volume pump, having an output on the order of about seven gallons per minute, and its output flows through line 80. Pump 72 is preferably a smaller pump than pumps 68 and 70, and develops an output on the order of five gallon per minute which is conveyed through line 82. A return line 84 includes an oil cooler 86 and filter 88, and is connected to the hydraulic fluid reservoir 24.

Figure 12:
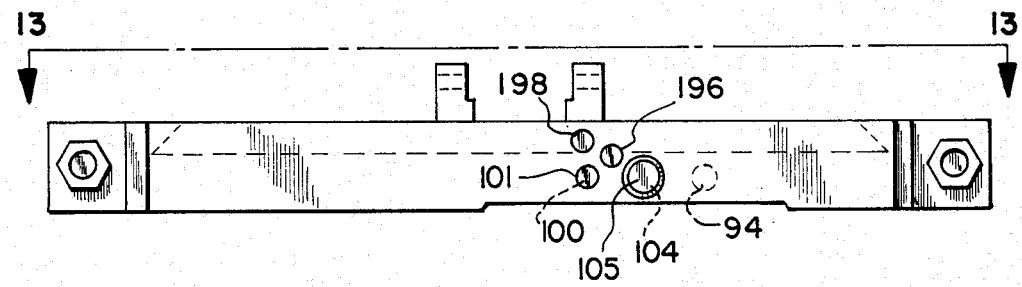
FIG. 12 is a top plan view of the side plate shown in FIG. 4, taken at line 12—12 in FIG. 4.

Lines 78, 80 and 82 from pumps 68-72 and return line 84 are connected to right side plate 30, which is best shown in FIGS. 4 and 5. Side plate 30 is substantially rectangular in shape and, as shown in FIG. 12, is relatively thin in comparison to its width and height. Side plate 30, like side plate 32 (FIG. 1) is anchored to the base 20 by angles 90 which are welded to the side plate and are attached to the base 20 by nut and bolt combinations 92.

Valving

In the following discussion of the valves mounted on side plate 30, the type and function of the valves will be discussed briefly. The generic type of valves used is shown schematically in FIGS. 14A and 14B and therefore will be readily apparent to one having skill in the art.

Extending upwardly through the interior of a lower portion of the side plate 30 is a pressure channel 94. A second pressure channel 96 extends upwardly through the interior of a lower portion of the side plate 30 and terminates at hole 98. An upper segment 100 of the second pressure channel 96 extends downwardly through the upper portion of the side plate 30 and terminates at hole 102. Pressure channels 94, 96, and 100 are plugged, preferably by tapped plugs such as plug 101 for channel 100, shown in FIG. 12. A return channel 104 extends downwardly through the upper portion of side plate 30 and terminates above the base 20. Channel 104 is closed by plug 105 at the top. Although the channels 94, 96, 100 and 104 can be formed within the side plate in a number of different ways, it is preferred that the channels be bored through a solid plate.

Figure 11:
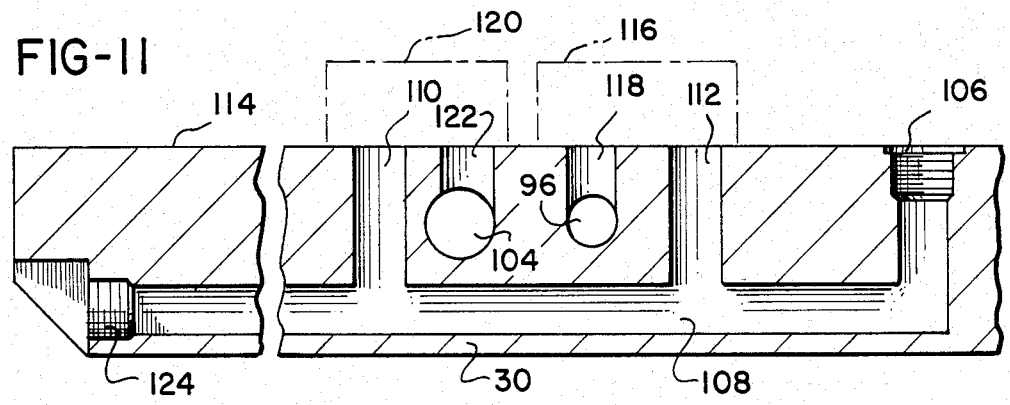
FIG. 11 is a detail of a cross section of the side plate shown in FIG. 5, taken at line 11—11 in FIG. 5.

As shown in FIGS. 3, 5 and 11, line 78 from pump 68 is connected to side plate 30 at hole 106 by a threaded connection 107 (FIG. 3). Hole 106 is connected to transverse channel 108 extending across a width of the plate 30. Transverse channel 108 is connected to holes 110 and 112. Mounted on an outside surface 114 of the side plate 30 is a check valve 116 (shown in phantom in FIG. 11 and schematically in FIG. 14B) having an upstream opening communicating with hole 112 and a downstream opening communicating with hole 118. Hole 118 is connected to supply channel 96. Thus, pump 68 is connected to pressure channel 96.

A relief valve 120 is mounted on the outside surface 114 and is connected to holes 110 and 122. When actuated, relief valve 120 allows pressurized fluid from the pump 68 and from pressure channel 96 to flow to return channel 104 in order to maintain pressure within channel 96 below a predetermined maximum valve. Transverse channel 108 is closed with a threaded plug 124.

Figure 9:
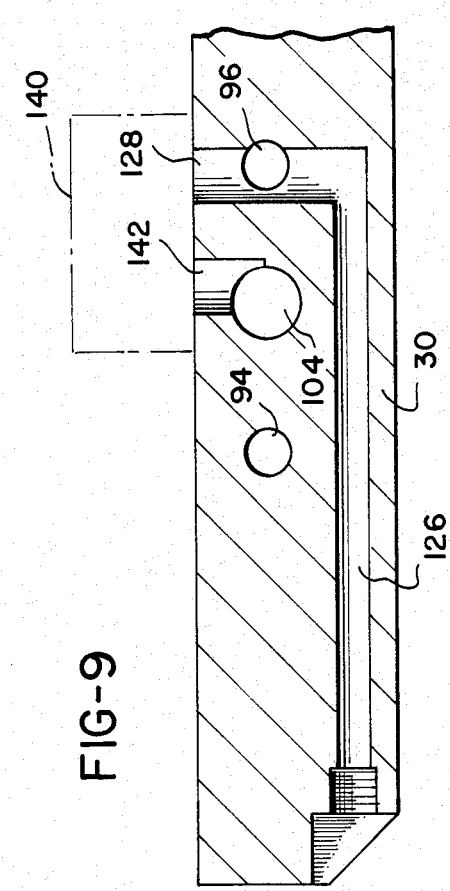
FIG. 9 is a detail of a cross section of the side plate shown in FIG. 5, taken at line 9—9 in FIG. 5.
Figure 10:
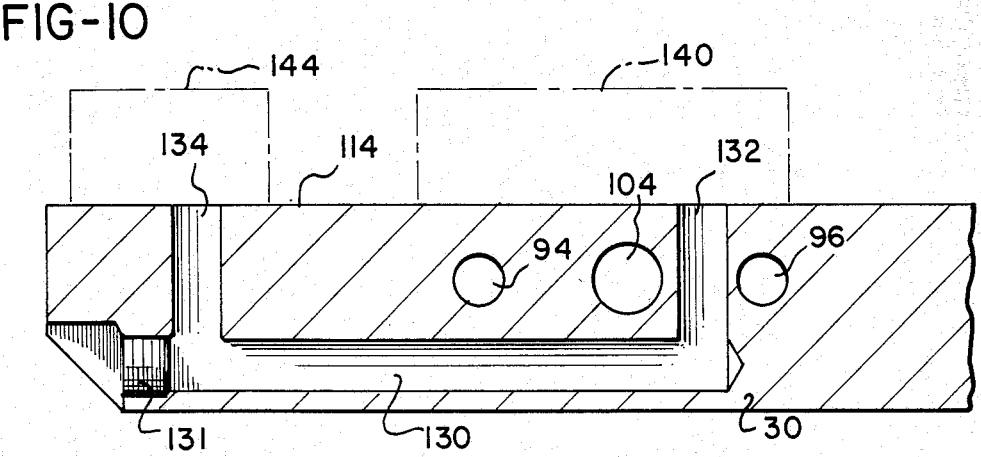
FIG. 10 is a detail of cross section of the side plate shown in FIG. 5, taken at line 10—10 in FIG. 5.

As shown in FIGS. 5, 9 and 10, side plate 30 includes a transverse channel 126 which is connected to hole 128 that, in turn, passes through pressure channel 96. Transverse channel 130 extends through side plate 30 and is connected to holes 132 and 134. Transverse channel 136 is oriented parallel to and adjacent to transverse channel 130 and is connected to pressure channel 94 and hole 138. A divert valve 140 is mounted on the outside surface 114 of side plate 30 and is connected to channel 96 by way of hole 128 and to return channel 104 by way of hole 142. As shown in FIGS. 5, 9, 10 and 14B, divert valve also is connected to hole 132. Hole 132 is connected to a check valve 144, by way of transverse channel 130 and hole 134, which in turn is connected to channel 94 by way of hole 138 and transverse channel 136.

The output of pump 70 is conveyed through line 80 to connection 146 (FIG. 3) which connects it to transverse channel 126. The output of pump 72 is conveyed through line 82 to connection 148 which communicates with transverse channel 136. Transverse channel 130 is closed with plug 131. Thus, the fluid output of pump 70 is conveyed through line 80 to connection 146, where it enters the transverse channel 126 of side plate 30. From the transverse channel 136, the output travels through hole 128 and into pressure channel 96 and valve 140. Valve 140 may be actuated to the position shown in FIG. 14B, in which case the fluid flows though hole 124 and into return line 104. Should the divert valve 140 be actuated to displace its spool downwardly, as shown in the schematic in FIG. 14B, the output is diverted through hole 132, transverse channel 130, hole 134 and into check valve 144. From check valve 144 the output travels through hole 138, transverse channel 136, and into channel 94.

Should the spool of divert valve 140 be actuated upwardly (FIGS. 3, 5, and 14B), the output of pump 72 is conveyed through line 82 to connection 148, where it enters the transverse channel 136 of side plate 30 and is conveyed to pressure channel 94. The system preferably includes a relief valve 150 (shown only in FIG. 14B) which provides a means for dumping the output of pump 72 from pressure channel 94 to return channel 104. Relief valve 150 preferably is mounted on side plate 30.

Referring again to FIGS. 3, 5 and 14B, side plate 30 includes a hole 152 which is connected to return channel 104. Hole 152 is joined to return line 84 at connection 154, so that the contents of channel 104 can be conveyed back to the reservoir 24.

Figure 14A:
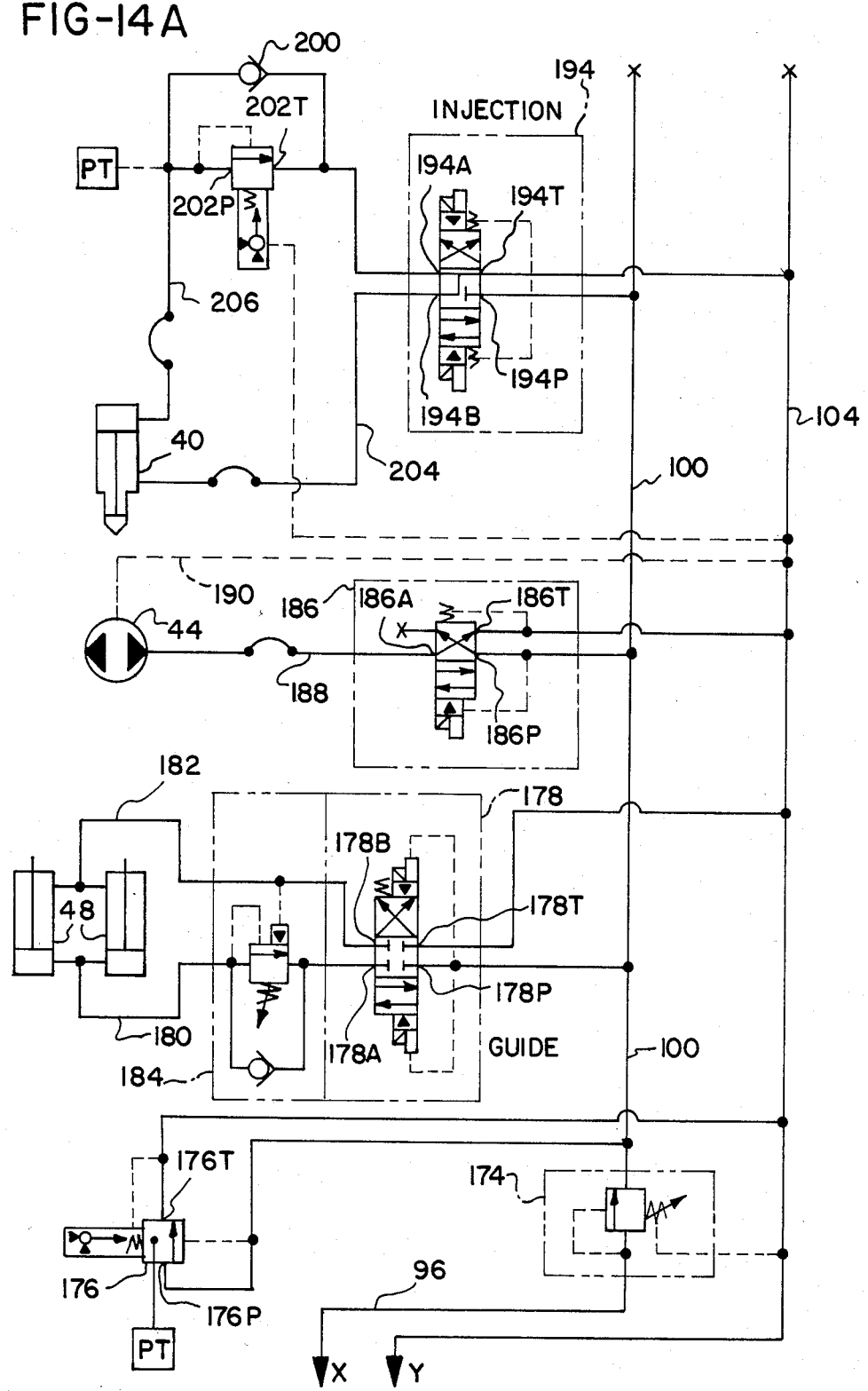
FIG. 14A is a portion of a hydraulic schematic diagram showing the types and arrangement of valves of the press shown in FIG. 1.
Figure 14B:
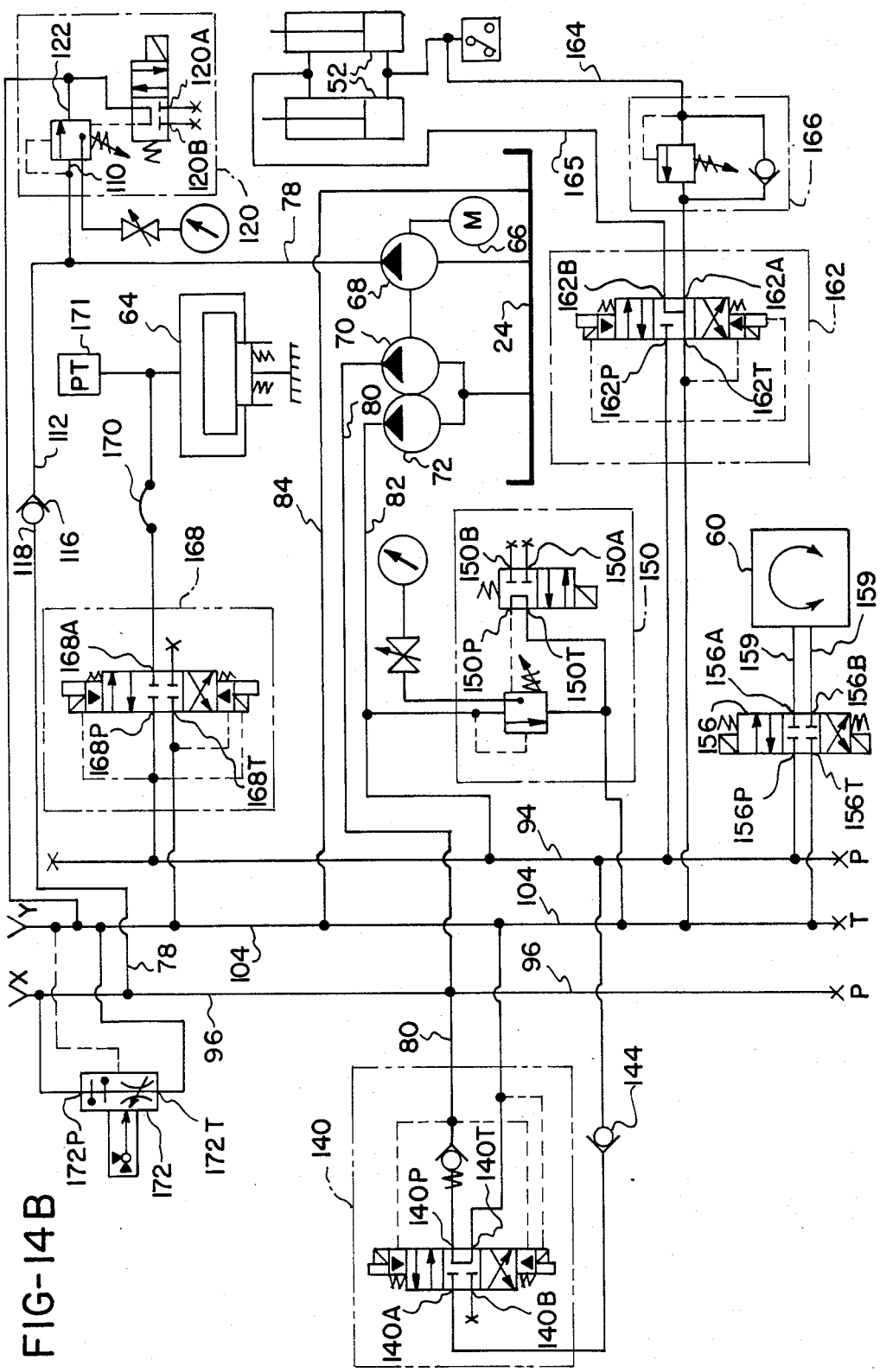
FIG. 14B is the remaining portion of the hydraulic schematic of the press shown in FIG. 1, and is connected at points X, Y thereof to points X, Y of FIG. 14A.

As shown in FIGS. 1, 5, 7 and 14B, valve plate 30 includes locking valve 156 which, as shown in FIG. 14B, controls actuator 60.

As shown in FIG. 5, valve 156 communicates with return channel 104 through hole 156T, and with pressure channel 94 through hole 156P and transverse channel 158 closed with a plug (not shown). Locking valve 156 can be actuated to connect holes 156A and 156B with either the pressure channel 94 or return channel 104 through holes 156P and 156T in order to rotate the actuator 60 in a clockwise or counterclockwise direction. Preferably, locking valve 156 is connected to actuator 60 by rigid conduits 159, which extend from holes 156A and 156B on the inside surface 160 of the plate 30, the conduit being shown schematically in FIG. 14B.

Figure 8:
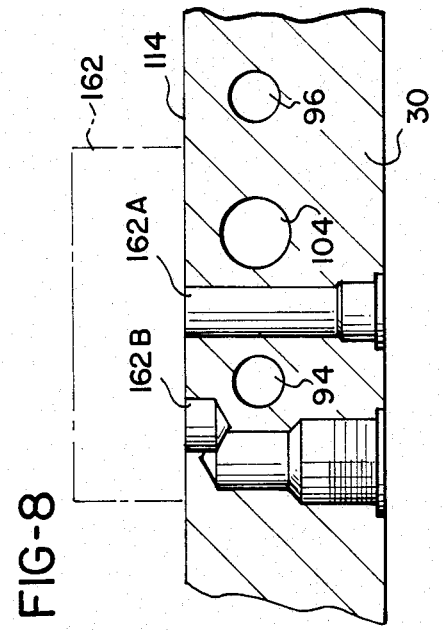
FIG. 8 is a detail of a cross section of the valve plate shown in FIG. 5, taken at line 8—8 in FIG. 5.

As shown in FIGS. 5, 8 and 14B, lifting valve 162 is mounted on the outside surface 114 of side plate 30 and is connected to pressure channel 94 through hole 162P, and to return channel 104 through hole 162T. The outlets of valve 162 are connected to holes 162A and 162B, which in turn are connected to the lifting cylinders 52 by rigid conduits 164, 165, respectively. Preferably, a counterbalance valve 166 is mounted on line 164 downstream of hole 162A. Valve 162 can be actuated to direct pressurized fluid from pressure channel 94 through either conduit 164 or conduit 165 to raise or lower, respectively, the lifting cylinders 52. Counterbalance valve 166 restricts the rate of fluid flow through conduit 164 to check the rate at which the cylinders lower the lower platen 50 (FIG. 1).

As shown in FIGS. 5 and 14B, a clamp valve 168 is mounted on the side plate 30 and communicates with pressure channel 94 through hole 168P, and with return channel 104 through hole 168T. Clamp valve 168 is connected to clamp cylinder 64 through hole 168A and a flexible section of conduit 170 (also shown in FIG. 1). Preferably, a pressure transducer 171 is operatively connected to cylinder 64 and clamp valve 168 in order to prevent the clamp valve from increasing the clamping pressure of the mold halves 38,50 supported on the hot plates 37,48 (FIG. 1), respectively, beyond a predetermined maximum amount. Clamp valve 168 can be actuated to direct fluid under pressure from pressure channel 94 to cylinder 64, or to allow fluid from cylinder 64 to flow to the return channel 104. The spring return, shown schematically in FIG. 14B, causes the cylinder to pump the fluid back to the return channel 104.

As shown in FIGS. 4 and 14A, a flow control valve 172 is mounted on the upper portion of side plate 30 and is in fluid communication with pressure channel 96 through hole 172P, and with return channel 104 through hole 172T. Flow control valve 172 operates to insure a constant flow in pressure channel 100.

As shown in FIGS. 4 and 14A, a sequence valve 174 is mounted on side plate 30 and communicates with pressure channel 96 through hole 98, and with pressure channel 100 through hole 102. Sequence valve 174 is set to open at a predetermined pressure level which insures a constant pressure level in pressure channel 96.

Relief valve 176 is mounted to side plate 30 above sequence valve 174 and is connected to pressure channel 100 through hole 176P, and to return channel 104 through hole 176T. Relief valve 176 acts to relieve the pressure in channel 100, should it exceed a predetermined level, by dumping pressurized fluid into the return channel 104.

The guide cylinders 48 are controlled by a guide valve 178 mounted on side plate 30, as shown in FIGS. 1, 4 and 14A. Guide valve 178 is in fluid communication with pressure channel 100 through hole 178P, and with return channel 104 through hole 178T. Guide valve 178 is connected to holes 178A and 178B which are joined to guide cylinders 48 by rigid conduits 180, 182, respectively. Preferably, guide valve 178 includes a counterbalance valve 184 which acts to control the flow of fluid from the cylinders 48 through conduit 180 and to return channel 104. When the spool of guide valve 178 is positioned as shown in FIG. 14A, the cylinders 48 are held such that their respective rods do not move upwardly or downwardly. The solenoid can be displaced to supply fluid under pressure from pressure channel 100 through either conduit 180 or conduit 182 to raise or lower the pistons within guide cylinders 48, thereby raising or lowering the injection tower 39 relative to the remainder of the pressing apparatus 28.

A screw valve 186 is mounted on side plate 30 above guide valve 178 and communicates with pressure channel 100 through hole 186P, and with return channel 104 through hole 186T. Screw valve 186 also is connected to hole 186A which, in turn, is connected to a section of flexible conduit 188 that is joined to the hydraulic motor of hydraulic screw 44. The outlet of hydraulic screw 44 is connected directly to return channel 104 by a flexible conduit 190 which attaches to the inside of inside surface 160 of side plate 30 at hole 192. Screw valve 186 is actuated to supply pressurized fluid through flexible conduit 188 (also shown in FIG. 2), to force liquified plastic material into the chamber 42 (FIG. 1).

Figure 13:
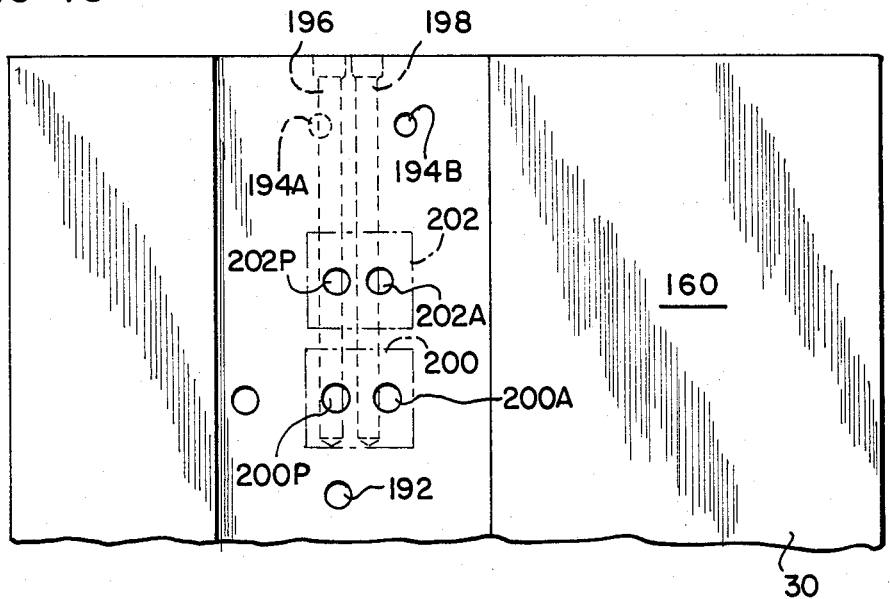
FIG. 13 is a detail showing a portion of the reverse side of the side plate shown in FIG. 4.

As shown in FIGS. 1, 4, 13 and 14A, the injection cylinder 40 is controlled by an injection valve 194 mounted on the outside surface 114 of side plate 30. Injection valve 194 is connected to pressure channel 100 through hole 194P, and to return channel 104 through hole 194T. Valve 194 is connected to hole 194A which, as shown in FIG. 13, extends through side plate 30 and intersects valve channel 196. A valve channel 198 is oriented parallel to and adjacent to valve channel 196, and both valve channels preferably are formed by drilling through the upper end of the side plate 30, as shown in FIG. 12. Valve channel 196 is plugged at its upper end so that its interior is completely sealed within side plate 30.

A check valve 200 and a back pressure valve 202 are mounted on the inner surface 160 of the valve plate 30, and each communicates with valve channels 196,198. Check valve 200 is connected to valve channel 196 through hole 200P, and to channel 198 through hole 200A. Similarly, back pressure valve 202 is connected to channel 196 through hole 202P, and to channel 198 through hole 202A. Injection valve 194 is connected to hole 194B which extends through plate 30 and is connected to injection cylinder 40 by flexible conduit 204. Similarly, channel 198 is connected to injection cylinder 40 by flexible conduit 206 which preferably extends through a connection (not shown) at the top of the plate 30.

Thus, injection valve 194 may be actuated to supply pressurized fluid through hole 194A, through channel 196, check valve 200, channel 198 and flexible conduit 206, to cause the injection cylinder 40 to depress its piston and convey a charge of liquified plastic to sprue 46 and the injection mold halves 38,50 (FIG. 1). Alternately, injection valve 194 can be actuated to convey pressurized fluid through flexible conduit 204 to injection valve cylinder 40, thereby raising the piston within the valve. This causes the fluid above the piston to be evacuated through line 206 and backpressure valve 202, which can be controlled to regulate the flow of fluid to the drain channel 104.

It should be noted that an advantage of a hydraulic press incorporating the side plate 30 of the present invention is that each of the valves mounted on the side plate, generally designated 208 in FIG. 1, can be positioned adjacent to its respective hydraulic component. In addition, the conduits extending from the side plate 30 to those hydraulic components, such as the lifting cylinders 52 or guide cylinders 58, can be made from relatively short sections of rigid conduit, which are less expensive and have a longer life than sections of flexible conduit.

It should also be noted that the arrangement of valves 208 on the side plate 30 is but one example of a possible valve arrangement, and that other valve arrangements, with corresponding modifications in the location and paths of the pressure channels and return channels, can be made without departing from the scope of the invention. For example, valves may be added to actuate safety doors, or a shuttle which slides the lower mold half 50 sidewardly from under the upper mold half. The most significant advantage of the invention is the location of the pressure channels 96,100 and return channel 104 within the side plate 30, thereby eliminating the need for a separate valve plate.

While the form of apparatus herein described constitutes a preferred embodiment of this invention, it is to be understood that the invention is not limited to this precise form of apparatus, and that changes may be made therein without departing from the scope of the invention.

What is claimed is:

1. In a hydraulic press of the type having a base, means mounted on said base for generating hydraulic pressure, a source of hydraulic fluid mounted on said base and communicating with said pressure generating means, an upper hot plate adapted to support a mold half, fluid actuated means for conveying liquid material to said upper hot plate, a platen mounted for vertical reciprocating movement relative to said upper hot plate and including a lower hot plate adapted to support a mold half, hydraulically actuated means for lifting said lower hot plate toward said upper hot plate and hydraulically actuated means for urging said lower hot plate upwardly, thereby clamping together mold halves supported on said hot plates, the improvement comprising:
a first side plate mounted on said base;
a second side plate mounted on said base, said second side plate having channel means formed in an interior thereof for conveying hydraulic fluid therethrough;
means joining said first and second side plates to form a rigid structure for supporting said upper and lower hot plates and said liquid conveying means;
conduit means communicating with said channel means and extending from said second side plate to said liquid material conveying means, said lower hot plate lifting means, and said urging means;
supply conduit means extending from said pressure generating means to said channel means;
return conduit means extending from said channel means to said source of hydraulic fluid;
valve means mounted on said second side plate and communicating with said channel means for selectively directing fluid from said channel means to said liquid material conveying means, said lower hot plate lifting means, and said urging means; and
control means for actuating said valve means in a predetermined sequence to direct fluid from said supply conduit means, through said channel means and said conduit means, to selected ones of said liquid material conveying means, said lower hot plate lifting means, and said urging means, and from said selected ones through said conduit means, said channel means and said return conduit means to said source.

2. The press of claim 1 wherein said channel means comprises a return channel connected to said return conduit means; and pressure channel means connected to said supply conduit means.

3. The press of claim 2 wherein said supply conduit means and said return conduit means each consist of a length of substantially rigid pipe.

4. The press of claim 3 wherein said second side plate includes transverse hole means extending from an outer wall to an inner wall thereof; said valve means includes a lift valve connected to said tank channel, said pressure channel means and said hole means; and said press includes substantially rigid conduit means extending between said hole channel means and said lower hot plate lifting means.

5. The press of claim 3 wherein said second side plate includes hole means extending from an outer wall to an inner wall thereof; said valve means includes a clamping valve communicating with said return channel, said pressure channel means, and said hole means; and said press includes rigid conduit means extending from said hole means to said urging means.

6. The press of claim 3 wherein said liquid material conveying means includes injection cylinder means; said second side plate includes first and second valve channel means and first and second hole means extending from an outer wall to an inner wall of said side plate, said first hole means intersecting said first valve channel means; said valve means includes check valve means and relief valve means connected to join said first valve channel means to said second valve channel means, and injection valve means connected to said return channel, pressure channel means, said first valve channel means and said injection cylinder means; and said second valve channel means is connected to said injection cylinder means.

7. The press of claim 3 wherein said liquid material conveying means includes a fluid actuated screw; said second side plate includes hole means extending from an outer wall to an inner wall thereof, and connected to said screw; and said valve means includes screw valve means communicating with said pressure channel means, said return channel, and said hole means.

8. In a hydraulic press of the type having a base, means mounted on said base for generating hydraulic pressure, a source of hydraulic fluid mounted on said base and communicating with said pressure generating means, upper means for supporting an upper mold half, fluid actuated means for conveying liquid material to an upper mold half, lower means for supporting a complementary mold half, fluid actuated means for reciprocating said lower supporting means in a vertical direction relative to said upper supporting means, and fluid actuated means for urging said supporting means to clamp supported mold halves together, the improvement comprising:

a first oblong side plate mounted on said base and extending upwardly therefrom;

a second oblong side plate mounted on said base and extending upwardly therefrom, said second side plate having channel means formed in an interior thereof and extending along a lengthwise dimension thereof;

means joining said side plates at upper and lower ends thereof, said side plates and joining means forming a rigid structure supporting said upper supporting means, liquid material conveying means, and lower supporting means, conduit means communicating with said channel means and extending from said side plate to said liquid material conveying means, said reciprocating means and said urging means;

supply conduit means extending from said pressure generating means to said channel means;

return conduit means extending from said channel means to said source of hydraulic fluid;

valve means mounted on said second side plate and communicating with said channel means such that passages are formed from said pressure generating means and from said source to said liquid material conveying means, said reciprocating means and said urging means; and control means for actuating said valve means in a predetermined sequence to selectively activate said liquid material conveying means, said reciprocating means and said urging means.

* * * * *